(12) United States Patent
Maeda

(10) Patent No.: US 6,884,009 B2
(45) Date of Patent: Apr. 26, 2005

(54) MACHINE TOOL

(75) Inventor: Masahiro Maeda, Yamanashi (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 10/432,087
(22) PCT Filed: Sep. 2, 2002
(86) PCT No.: PCT/JP02/08887
§ 371 (c)(1), (2), (4) Date: May 20, 2003
(87) PCT Pub. No.: WO03/026842
PCT Pub. Date: Apr. 3, 2003

(65) Prior Publication Data
US 2004/0047700 A1 Mar. 11, 2004

(30) Foreign Application Priority Data
Sep. 21, 2001 (JP) ........................................ 2001-289446

(51) Int. Cl.⁷ .............................................. B23C 9/00
(52) U.S. Cl. ........................ 409/134; 409/137; 409/136
(58) Field of Search ................................ 409/137, 136, 409/135, 134; 29/DIG. 94, DIG. 50, DIG. 102; 408/67, 56; 184/6.14

(56) References Cited

U.S. PATENT DOCUMENTS

| 5,205,686 A | * | 4/1993 | de Caussin | 409/137 |
| 5,586,848 A | * | 12/1996 | Suwijn | 409/137 |
| 5,779,402 A | * | 7/1998 | Kameda | 409/137 |
| 6,082,939 A | * | 7/2000 | Nakashima et al. | 409/134 |
| 6,120,222 A | * | 9/2000 | Hiramoto et al. | 409/137 |
| 6,210,086 B1 | * | 4/2001 | Lecornet et al. | 409/137 |
| 6,220,799 B1 | | 4/2001 | Okutani et al. | |
| 6,357,576 B1 | * | 3/2002 | Enomoto | 409/137 |
| 6,409,641 B1 | * | 6/2002 | Hashimoto | 409/137 |

FOREIGN PATENT DOCUMENTS

| JP | 10-094927 | | 4/1998 | |
| JP | 10244437 A | * | 9/1998 | ........... B23Q/11/10 |
| JP | 10-328968 | | 12/1998 | |
| JP | 10328968 A | * | 12/1998 | ........... B23Q/11/00 |
| JP | 2000-33530 | | 2/2000 | |
| JP | 2000033530 A | * | 2/2000 | ........... B23Q/11/00 |

* cited by examiner

Primary Examiner—A. L. Wellington
Assistant Examiner—Dana Ross
(74) Attorney, Agent, or Firm—Paul & Paul

(57) ABSTRACT

The invention relates to a machine tool which processes a workpiece through the relative motions between a tool and the workpiece in X-, Y- and Z-axes three directions. The object of the invention is to ensure the collection and ejection of the chips with a simple configuration. The invention comprises a trough 27 provided in the central part of a bed 1 to extend in back-and-forth direction, a pair of guides 9 disposed at left-and-right sides of the trough 27, a Z-axis feed screw 31 disposed adjacent one of the guides 9, and slant covers 37 and Z-axis telescopic covers 39 for covering the pair of guides 9 and the Z-axis feed screw 31. Chip conveyer nozzles 47 and 49 are provided within the trough 27 for directing the machining fluid to eject the chips from the machine.

2 Claims, 3 Drawing Sheets

MACHINE TOOL

FIELD OF THE INVENTION

The invention relates to a machine tool such as a milling machine and machining center for processing a workpiece through relative movements between the workpiece and a tool in X-, Y- and Z-axes, and in particular to a machine tool including a splashguard enclosing the machining zone and a trough, disposed under a bed, for receiving the chips and machining fluid to eject them out of the machine.

BACKGROUND ART

In the field of machine tools, effective ejection of the chips and machining fluid has been one of the important subjects for the research and development. For example, Japanese Unexamined Patent Publication (Kokai) No. 10-328968 describes a machine tool as a first prior art. This comprises a splashguard for enclosing a machining zone, a trough extending in the back-and-forth direction along the center of a bed, guides, provided on the bed at the left-and-right sides of the trough, for the back-and-forth motion of a table, the table being disposed over the trough, a single feed screw, provided at the center beneath the table, for feeding the table in the back-and-forth direction, and a cover for covering the guides and the feed screw wherein the chips and machining fluid falling into the trough are ejected from the machine.

Japanese Unexamined Patent Publication (Kokai) No. 2000-33530 describes a machine tool as a second prior art. This is an improvement of the invention of the first prior art, and has a difference in the configuration that, instead of the single feed screw disposed at the center beneath the table, a single feed screw is disposed at each of the left-and-right sides of the trough, i.e., two screws. This allows increase in the size of the opening of the trough so that the chips and fluid can easily fall into the trough.

On the other hand, although there is not described in the above two documents, some machine tools comprise spindle nozzles, disposed around the spindle, for directing the machining fluid to the machining zone between the cutting edge of a tool and a workpiece or shower nozzles for downwardly directing the machining fluid from the ceiling of a splashguard to wash away the chips on a workpiece, a workpiece mount, the top of a table and/or covers into the trough. In the trough, there is provided a mechanical chip conveyer which ejects the fallen chips and the machining fluid from the machine or a fluid chip conveyer which conveys the chips with the pressure of machining fluid directed in one way. A pump and a fluid circuit for supplying the machining fluid to a chip conveyer nozzle of the fluid chip conveyer is usually provided separately from the pump and the circuit for a process nozzle.

According to the first prior art, the screw for feeding the table and the cover for the feed screw is disposed at the center of the trough. Therefore, the area of the opening of the trough is reduced by the cover, which obstructs the collection of the chips and the machining fluid in the trough.

According to the second prior art, the area of the trough opening is increased, because the two screws for feeding the table are disposed at the outside of the trough. However, in the second prior art, the number of the feed screws is increase by one, and a mechanism and a controller for driving the two feed screws in synchronization with each other are required. Therefore, there are problems that the configuration becomes complex and the production cost is increased.

The provision of the mechanical chip conveyer in the trough results in the problems of the complex configuration and increase in the production cost. In case that the fluid chip conveyer is employed, in addition to the machining fluid pump for supplying the machining fluid to the process nozzle, a machining fluid pump is required for supplying the machining fluid to the chip conveyer nozzle.

SUMMARY OF THE INVENTION

The invention is directed to solve the problems of the prior art, and the object of the invention is to provide a machine tool which ensures the collection and ejection of the chips with a simple configuration.

According to the invention, a machine tool for processing a workpiece through relative movements between the workpiece and a tool in three directions of X-, Y- and Z-axes, comprising a bed providing the base of the machine; a column movable along a guide extending in the left-and-right direction on a rear part of the bed; a spindle head movable along a guide extending in the up-and-down direction on the front face of the column and having a spindle receiving a tool at the end thereof; a trough disposed within a recess extending in the back-and-forth direction in the center of the bed; a table, disposed over the trough for the back-and-forth liner motion along a pair of guides extending in the back-and-forth direction and disposed on the bed at the either side of the trough, for mounting the workpiece; a feed screw, disposed outside of the trough, and inside, adjacent and parallel to either one of the pair of guides, for feeding the table in the back-and-forth direction; a splashguard, enclosing a machining zone, for preventing the chips and the machining fluid from spreading out; a cover for covering the guides for the table and the feed screw over the full stroke of the back-and-forth motion of the table and for introducing the chips and the machining fluid into the trough; a process nozzle, disposed around the spindle, for directing the machining fluid to the machining zone; and a chip conveyer nozzle, disposed in the trough, for directing the machining fluid to transfer the chips within the trough out of the machine.

The machine tool may further comprise a machining fluid tank for containing the machining fluid; a machining fluid pump for supplying the machining fluid to the process nozzle and the chip conveyer nozzle from the machining fluid tank; a conduit for transferring the machining fluid in the machining fluid tank to the process nozzle and the chip conveyer nozzle; and a switching valve, disposed in the conduit, for directing the machining fluid supplied by the machining fluid pump to the process nozzle and the chip conveyer nozzle when the workpiece is processed, and for directing the machining fluid supplied by the machining fluid pump only to the chip conveyer nozzle when the workpiece is not processed. In this case, the feed screw may comprise a pair of feed screws provided outside of the trough parallel to the pair of guides.

As described above, the single feed screw is provided outside of the trough and adjacent one of the guides. This provide a simple table feeding mechanism and larger trough opening so that the chips and the machining fluid can easily fall into the trough. A single cover disposed outside of the trough can cover both the one of the guides and the single feed screw. This cover cooperates with another cover for covering the other guides to introduce the chips and the machining fluid into the trough. By appropriately adjusting the distance between the guides and the table, allowable feeding tolerance is ensured if the feed screw is offset relative to the center of the table. Therefore, this configuration is more simple compared with the configuration of the two screws with a symmetric rotation of prior art.

Further, the single common machining fluid pump supplies the machining fluid to the process nozzle and the chip conveyer nozzle. When the workpiece is processed, the machining fluid is distributed to the nozzles to remove the chips from the machining zone and to wash the chips into the trough as mach as possible with a minimum flow of the machining fluid for preventing the collection of the chips on the workpiece, the workpiece mount, the top of the table, the cover and the others. When the process is terminated, the machining fluid is supplied only to the chip conveyer nozzle. This allows all amount of the machining fluid discharged from the pump to be discharged through the chip conveyer nozzle to ensure the eject of the chips, which has fallen in the trough, out of the machine.

BRIEF DESCRIPTION OF THE DRAWINGS

The preferred embodiment of the invention will be described below with reference to the drawings, in which.

THE MOST PREFERRED EMBODIMENT

Figure 1:
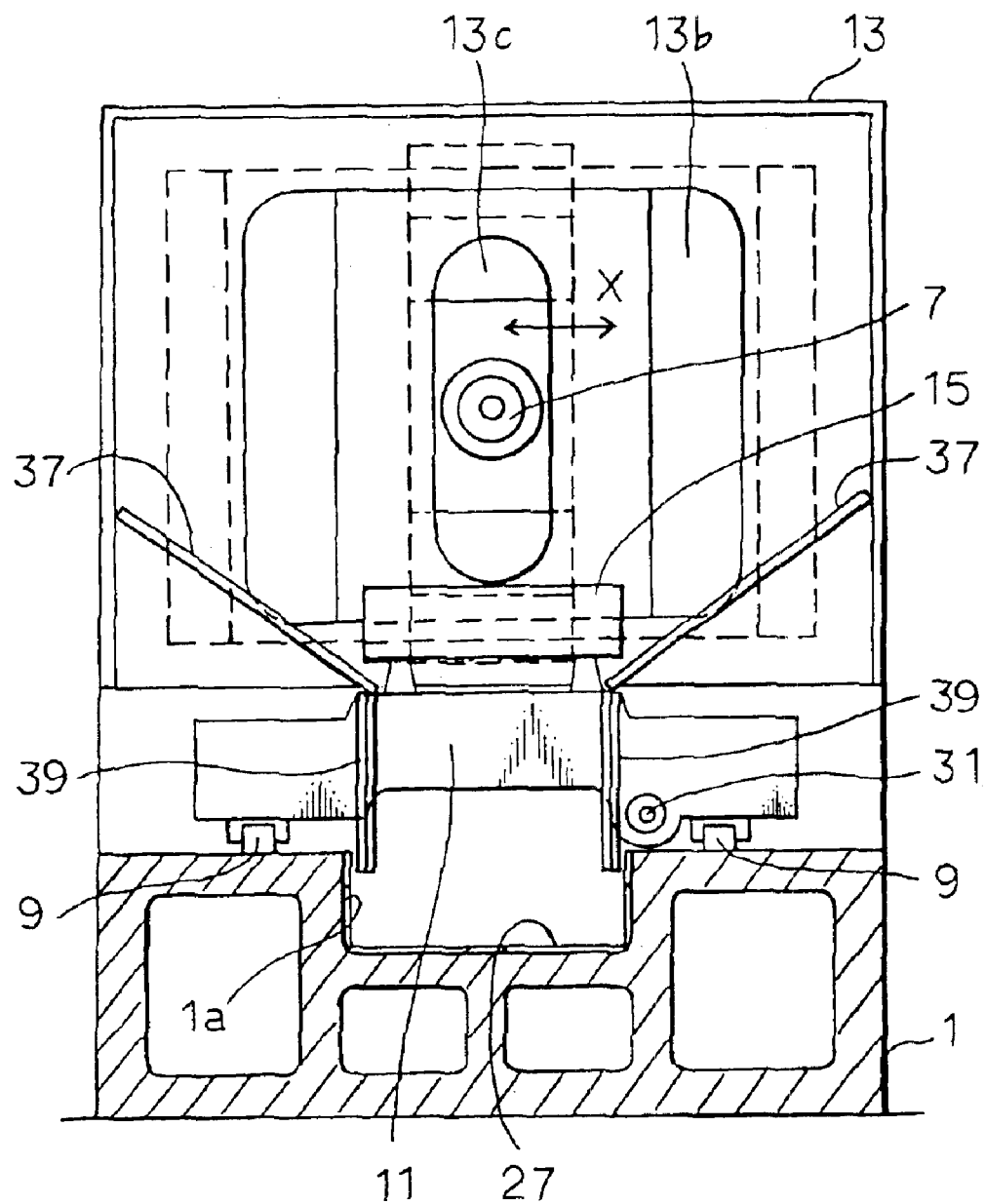
FIG. 1 is a front section of the machine tool of the invention.
Figure 2:
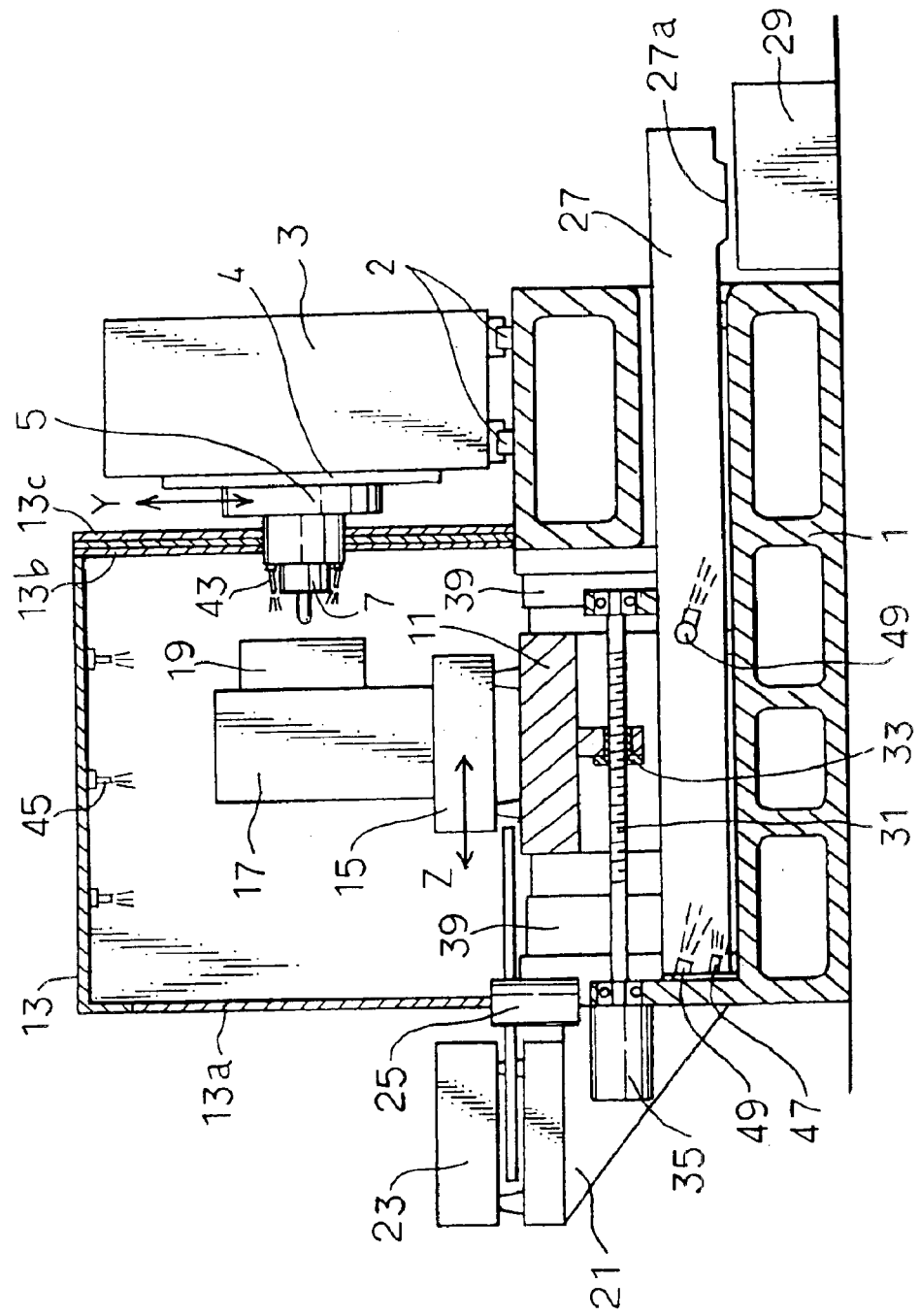
FIG. 2 is a side section of the machine tool of FIG. 1.

A machine tool is composed of a bed 1, a column 3 movable in X-axis along a pair of guides 2 extending in left-and-right direction along ridges provided in the rear part of the bed 1, a spindle head 5 movable in Y-axis along a pair of guides 4 extending in up-and-down direction along the front face of the column 3, a spindle 7 rotationally provided in the spindle head 5 and receiving a tool at the end thereof, a table 11 movable in Z-axis along a pair of guides 9 extending back-and-forth direction along the top face of the front part of the bed 1 and a splashguard 13 which encloses the machining zone to prevent the chips and the machining fluid from spreading out.

A pallet 15 is detachably mounted on the table 11. A workpiece 19 is secured to the pallet 15 through a workpiece mount 17. The workpiece 19 is processed through the relative movement in X-, Y- and Z-axes between the tool on the rotating spindle 7 and the workpiece 17. A pallet base 21 is mounted to the front end of the bed 1. A pallet 23 is put on the pallet base for removing the processed workpiece and attaching another workpiece for the subsequence process. A rotating pallet changing arm 25 is further provided on the bed 1 between the table 11 and the pallet base 21. The pallet 15 on the table 11 which has positioned to a pallet changing position and the pallet 23 on the pallet base 21 are changed with each other through up-and-down and rotational motions of the pallet changing arm 25.

A rotating panel 13a which provides the front face of the splashguard 13 is disposed on the rotational axis of the pallet changing arm 25 to move with the pallet changing arm 25. An X-axis telescopic cover 13b and a Y-axis telescopic cover 13c which provide the rear face of the splashguard 13 extend and retract to follow the motions of the spindle head 5 in X- and Y-axes directions.

On the other hand, a trough 27 is provided in the laterally (in the left-and-right direction) center of the bed 1 under the table 11, which trough extends in back-and-forth direction. The trough 27 comprises a sheet metal member which includes a front end closed by a wall and an open end and is attached to a recess 1a of the bed 1. The trough 27 receives the falling chips and machining fluid, rewardly transfers the chips and the machining fluid and lets them drop through a pitfall 27a into a machining fluid tank 29 to eject them. The trough 27 is secured to the bed 1 by a plurality of spacers of a thermally insulating material to form an air layer between the trough and the bed. This prevents the heat of the heated machining fluid from transferring to the bed 1. The bottom wall of the trough 27 is inclined to lower its rear end.

The pair of guides 9 are provide on the bed 1 outside the left-and-right sides of the trough 27 for guiding the Z-axis movement of the table 11. In this embodiment, a feed screw-nut mechanism comprises a single Z-axis feed screw 31 which is rotationally supported by the bed 1 between the right-side guide 9a and the trough 27 and a nut 33 provided on the bottom of the table 11. The Z-axis feed screw 31 is rotationally driven by a motor 35 disposed at the front end of the bed 1.

For the protection from the chips and the machining fluid, the pair of guides 9 and the Z-axis feed screw 31 are covered by a pair of lateral slant covers 37 and Z-axis telescopic covers 39 which are vertically oriented and connected to the corners of the table 11. Thus, the chips and the machining fluid fall into the trough 27 with the guidance by the splashguard 13, the slant covers 37 and the Z-axis telescopic covers 39.

A filter device (not shown) is incorporated with the machining fluid tank 29. The filtrated machining fluid is recirculated by a machining fluid pump 41 for reuse. A plurality of spindle nozzles 41 are disposed at the front end of the spindle head 5 around the spindle 7 for directing the machining fluid supplied by the machining fluid pump 41 to the machining zone between the cutting edge of the tool and the workpiece 19 to cool the machining zone and expel the chips. A plurality of shower nozzles 45 are provided on the ceiling of the splashguard 13 for downwardly directing the machining fluid supplied from the machining fluid tank 29 by the machining fluid pump 41 to wash away the chips on the workpiece mount 17, the table 11, the slant covers 37 and others. The term "process nozzle", described in the claims, means the spindle nozzle 43 and/or the shower nozzles 45.

First and second trough nozzles 47 and 49 are provided at the front end of the trough 27 for rewardly directing the machining fluid, supplied from the machining fluid tank 29 by the machining fluid pump 41. A plurality of the respective first and second trough nozzles 47 and 49 may be disposed at the front end of the trough 27. The second trough nozzle 49 may be disposed at the longitudinally intermediate portion of the trough 27. The first and second trough nozzles 47 and 49 provide chip conveyer nozzles for rewardly transferring the chips in the trough 27 with the discharged machining fluid to let them drop through the pitfall 27a into the machining fluid tank 29.

Figure 3:
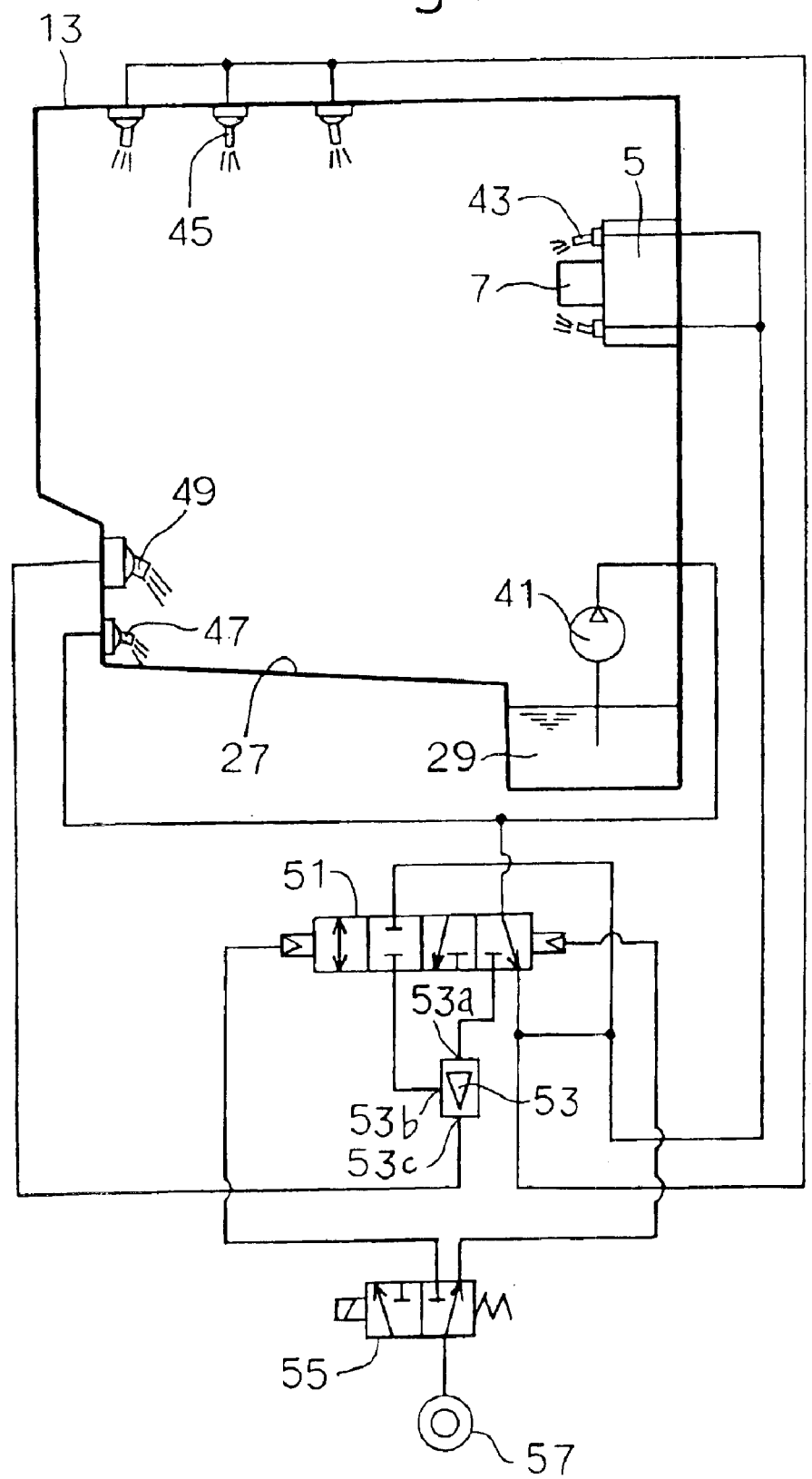
FIG. 3 is a machining fluid supply circuit for the machine tool of the invention.

Next, with reference to FIG. 3, the method of supplying the machining fluid to the respective nozzles. When the workpiece 19 is processed, for example, when the spindle 7 rotates, the machining fluid discharged from the fluid pump 41 is supplied to the first trough nozzle 47 and to the spindle nozzle 43 and the shower nozzle 45 through a switching valve 51. At that time, the machining fluid is not supplied to an ejector 53. When a workpiece is not processed, for example, when the spindle is stopped, a solenoid valve 53 is switched to change the direction of the pressurized air from a pressurized air source 57 to switch the ports of the switching valve 51. This terminates the supply of the machining fluid to the spindle nozzle 43 and the shower nozzles 45 so that a portion of the machining fluid discharged from the pump 41 is supplied to the first trough nozzle 47 and the remaining machining fluid is supplied to an inlet port 53a of the ejector 53. Therefore, negative pressure generated at a suction port 53b of the ejector 53 allows the ejector 53 to draw the machining fluid left in the conduits of the spindle nozzle 43 and the shower nozzle 45, which conduits are connected to the suction port 53b, so that the drawn machining fluid is discharged through a discharge port 53c of the ejector 53 along with the machining fluid supplied to the inlet port 53a and finally through the second trough nozzle 49. Hence, all of the machining fluid discharged from the machining fluid pump 41 is directed into the trough 27 so that the chips are transferred with the full flow rate of the machining fluid. In this connection, the principal of the ejector is described, for example, in Japanese Patent No. 2965468 and known in the art. Therefore, its detailed explanation is omitted. When a workpiece is not machined, the machining fluid left in the conduits of the spindle nozzle 43 and the shower nozzle 45 is drawn by the ejector 53 so that no machining fluid drips from the spindle nozzles 43 and the shower nozzles 45.

As described above, the disposition of the single screw 31 for feeding the table 11 in the Z-axis direction adjacent the Z-axis guide 9 simplifies the constitution and allows the opening of the trough 27 to be increased so that obstructions for the chips and the machining fluid falling into the trough 27 can be removed.

The arrangement composed of the single machining fluid pump 41, for supplying the machining fluid to the spindle nozzles 43, the shower nozzles 45 and first and second trough nozzles 47 and 49 with the flow paths switchable between in-process and out-of-process conditions allows the simple configuration to surely transfer the chips with a large amount of the machining fluid directed into the trough 27 when the workpiece 19 is not processed and the chips in the trough 27 is transferred. This arrangement can simplify the configuration for supplying the machine tool in a configuration having a left-and-right pair of Z-axis screws disposed outside of the trough.

Incidentally, although the Z-axis feed screw 31 is disposed inside of the Z-axis guide 9 in the embodiment, it may be disposed adjacent and outside of the guide. Further, the invention can be applied to a vertical machine tool instead of the horizontal machine tool.

What is claimed is:

1. A machine tool for processing a workpiece through relative movements between the workpiece and a tool in three directions of x-, y- and z-axes, comprising:

a bed providing a base of the machine, a column movable along a guide extending in the left-and-right direction on a rear part of the bed;

a spindle head movable along a guide extending in the up-and-down direction on a front face of the column and having a spindle receiving a tool at an end thereof;

a trough disposed within a recess extending in a back-and-forth direction in the center of the bed;

a table, disposed over the trough for back-and-forth linear motion along a pair of guides extending in the back-and-forth direction and disposed on the bed at a side of the trough, for mounting the workpiece;

a feed screw, disposed outside of the trough, and inside, adjacent and parallel to either one of the pair of guides, for feeding the table in the back-and-forth direction;

a splashguard, enclosing a machining zone, for preventing chips and machining fluid from spreading out;

a cover for covering the guides for the table and the feed screw over the full stroke of the back-and-forth motion of the table and for introducing the chips and the machining fluid into the trough;

a process nozzle, disposed around the spindle, for directing the machining fluid to the machining zone; and a chip conveyor nozzle, disposed in the trough, for directing the machining fluid to transfer the chips within the trough out of the machine;

a machining fluid tank for containing the machining fluid;

a machining fluid pump for supplying the machining fluid to the process nozzle and the chip conveyer nozzle from the machining fluid tank;

a conduit for transferring the machine fluid in the machining fluid tank to the process nozzle and the chip conveyer nozzle; and a switching valve, disposed in the conduit, for directing the machining fluid supplied by the machining fluid pump to the process nozzle and the chip conveyer nozzle when the workpiece is processed, and for directing the machining fluid supplied by the machining fluid pump only to the chip conveyer nozzle when the workpiece is not processed.

2. A machine tool according to claim 1, wherein the feed screw comprises a pair of feed screws provided outside of the trough parallel to the pair of guides.

* * * * *